United States Patent
Guo

(10) Patent No.: US 7,143,391 B1
(45) Date of Patent: Nov. 28, 2006

(54) METHOD AND APPARATUS FOR GLOBALIZATION TESTING COMPUTER SOFTWARE

(75) Inventor: Hui Guo, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 579 days.

(21) Appl. No.: 10/316,568

(22) Filed: Dec. 11, 2002

(51) Int. Cl.
G06F 9/44 (2006.01)
G06F 9/445 (2006.01)
G06F 11/00 (2006.01)

(52) U.S. Cl. .............. 717/124; 717/173; 717/178; 714/38

(58) Field of Classification Search ........ 717/124–135, 717/173, 178; 714/37–39
See application file for complete search history.

(56) References Cited

U.S. PATENT DOCUMENTS 6,138,112 A * 10/2000 Slutz .............................. 707/2
6,157,935 A * 12/2000 Tran et al. ................... 715/503
6,289,382 B1 * 9/2001 Bowman-Amuah ......... 709/226
2003/0131285 A1 * 7/2003 Beardsley et al. ............ 714/38

* cited by examiner

Primary Examiner—Toan Dam
Assistant Examiner—Chuck Kendall
(74) Attorney, Agent, or Firm—Park, Vaughan & Fleming LLP; Edward J. Grunuler

(57) ABSTRACT

One embodiment of the present invention provides a system that automates the process of globalization testing software. The system operates by first receiving a request at a server from a user to access a computing resource that specifies an operating system and an interface language for the computing resource. In response to the request, the system performs a database lookup to identify available computers on which to perform the test, and available image files for the operating system and interface language combination. After a user has selected a computer and an image file, the system determines a location of an image store containing the image file. The system then pushes the image file from the image store to the selected computer and notifies the user that the image file has been downloaded to the computer, thereby allowing the user to perform tests on the computer using the image file.

21 Claims, 2 Drawing Sheets

METHOD AND APPARATUS FOR GLOBALIZATION TESTING COMPUTER SOFTWARE

BACKGROUND

1. Field of the Invention

The present invention relates to the process of testing computer software. More specifically, the present invention relates to a method and an apparatus for automating the process of globalization testing computer software.

2. Related Art

Computer software to be widely distributed throughout an international marketplace should ideally be tested in all of the possible computing environments in which the software is likely to run. For example, in order to ensure that a piece of software operates properly, the software should be tested on all possible combinations of operating system versions, such as Windows™98, Windows 2000, Windows NT, and Windows XP, and interface languages, such as Chinese, Korean, Japanese, German, French, and English. This type of testing is referred to as "globalization testing."

Globalization testing can be an extremely time-consuming task. Testing a piece of computer software typically entails locating a computer system upon which to perform the test, and reserving the computer system for the duration of the test. It also involves determining if the computer system includes the correct operating system and interface language combination, and if not, loading the correct operating system and interface language combination. Next, the testing process involves loading the software to be tested and performing the test. After the testing process is complete, the computer system is released, so that another user can test another piece of computer software.

This testing process can be challenging because the test computer system is often located in a test laboratory that has limited access, or is located at a remote site. Moreover, since there are many possible combinations of operating systems and interface languages, providing a dedicated computer system for each possible combination is prohibitively expensive. Additionally, because many users may potentially use the test computer systems, scheduling time on the test computer systems can be a problem.

Configuring a computer system for testing can be a time-consuming process. The process typically involves loading a different operating system and interface language combination onto the computer system, which requires the user, or a person acting on the user's behalf, to physically access the computer system. This person typically has to reboot the computer system and select a partition that contains the desired operating system and interface language. If no currently available partition includes the desired operating system and interface language, a partition must be created with the desired operating system and interface language combination. Note that this configuration process is manual, and is consequently prone to error.

Hence, what is needed is a method and an apparatus for automating the process globalization testing computer software without the problems described above.

SUMMARY

One embodiment of the present invention provides a system that automates the process of globalization testing software. The system operates by first receiving a request at a server from a user to access a computing resource, wherein the request specifies an operating system and an interface language for the computing resource. In response to the request, the system performs a database lookup to identify available computers on which to perform the test, and available image files for the operating system and interface language combination. After a user has selected a computer and an image file, the system determines a location of an image store containing the image file. The system then pushes the image file from the image store to the selected computer and notifies the user that the image file has been downloaded to the computer, thereby allowing the user to perform tests on the computer using the image file.

In a variation of this embodiment, if the image file is not available in the image store, the system creates the image file for the operating system and interface language combination. The system then saves the image file into the image store.

In a further variation, the system reserves the computer for a specified period of time.

In a further variation, the system allows the user to test a software component with the image file on the computer. In this variation, the software component becomes part of the image file.

In a further variation, the system uploads the image file to the image store for subsequent reuse, wherein the image file includes the software component.

In a further variation, the system authenticates the user prior to allowing the user to perform testing.

In a further variation, notifying the user involves delivering an electronic mail message to the user or posting status to a web page for the user.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Systems

Figure 1:
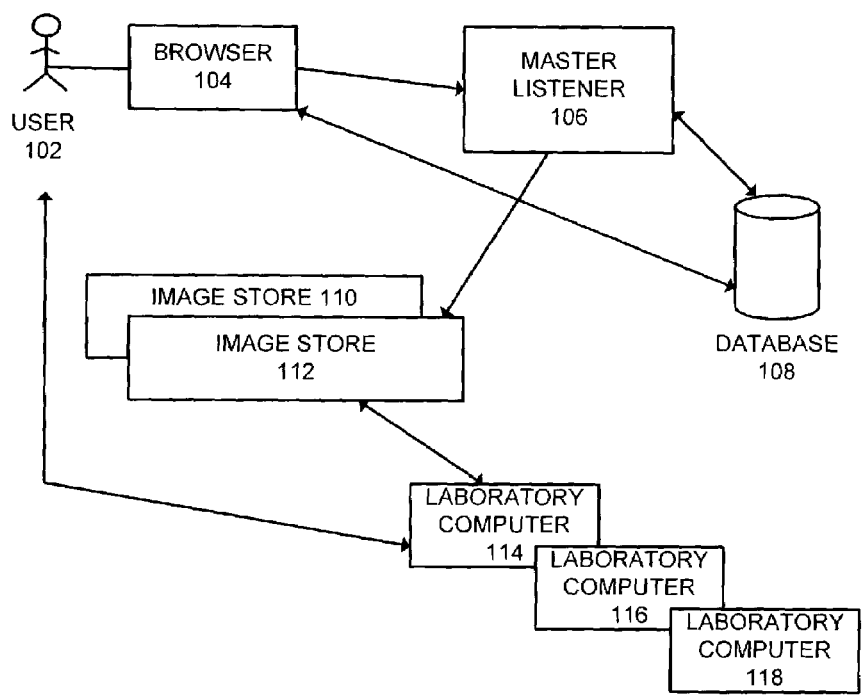
FIG. 1 illustrates computing systems coupled together in accordance with an embodiment of the present invention.

FIG. 1 illustrates a number of computing systems and other components coupled together in accordance with an embodiment of the present invention. In particular, FIG. 1 illustrates browser 104, master listener 106, database 108, image stores 110 and 112, and laboratory computers 114, 116, and 118.

During operation, user 102 controls and directs the system using browser 104. Browser 104 can generally include any type of web browser capable of viewing a web site, such as the INTERNET EXPLORER™ browser distributed by the Microsoft Corporation of Redmond, Wash. Browsers are well known in the art. Therefore, the operation of browser 104 will not be discussed further herein. Note that the various components shown in FIG. 1 can be distributed globally or can be collocated at one or more sites.

Master listener 106 forms a portion of a web server (not shown). During operation, master listener 106 receives requests from browser 104 to access a computing resource in a test laboratory in order to perform tests on computer software. These requests typically specify an operating system and an interface language for the test.

Browser 104 and master listener 106 both communicate with database 108. Database 108 can include any type of system for storing data in non-volatile storage. This includes, but is not limited to, systems based upon magnetic, optical, and magneto-optical storage devices, as well as storage devices based on flash memory and/or battery-backed up memory. The data stored within database 108 includes a list of available laboratory computers and a list of current image files for different operating system and interface language combinations. The list of available image files identifies the image store that holds each available image file.

Image stores 110 and 112 contain downloadable image files for various combinations of operating systems and interface languages. Note that there can be more image stores than shown in FIG. 1. During operation, master listener 106 uses database 108 to determine the closest image store (to the test laboratory) that holds the desired image file. This image file is then downloaded to one of laboratory computers 114, 116, or 118 at the test laboratory.

Laboratory computers 114, 116, or 118 are representative of the computers in a test laboratory. Note that there can be more or fewer laboratory computers than shown in FIG. 1, and that these laboratory computers can reside in more than one physical location. After the image file has been downloaded to a laboratory computer, say laboratory computer 114, laboratory computer 114 notifies user 102 that the image file has been downloaded and is available for software testing. This notification can be an e-mail message, a status message displayed on browser 104, or any other suitable means of informing user 102 that laboratory computer 114 is available.

Image Store

Figure 2:
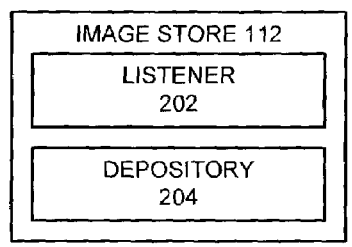
FIG. 2 illustrates an image store in accordance with an embodiment of the present invention.

FIG. 2 illustrates an image store 112 in accordance with an embodiment of the present invention. Image store 112 includes listener 202 and depository 204. Image store 112 is representative of the image stores within the system and will be the only image store discussed herein.

Listener 202 is a component that communicates with master listener 106 and laboratory computers 114, 116, and 118. Listener 202 receives instructions from master listener 106 to download a specified image file into a laboratory computer, say laboratory computer 114. In response to these instructions, listener 202 locates the specified image file in depository 204 and downloads this image file to laboratory computer 114.

Depository 204 contains image files for downloading to laboratory computers at the direction of user 102. Each image file stored in depository 204 includes an operating system integrated with an interface language, and can also include software under test. The image files stored in depository 204 are cataloged in database 108 so that browser 104 and master listener 106 can determine the availability of the image files. After an image file is downloaded to a laboratory computer and is modified (by, for example, adding a software component), or after an image file has been created at laboratory computer 114, the image file can be returned to depository 204 for subsequent use.

Laboratory Computer

Figure 3:
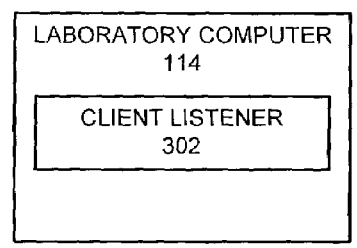
FIG. 3 illustrates a laboratory computer in accordance with an embodiment of the present invention.

FIG. 3 illustrates a laboratory computer 114 in accordance with an embodiment of the present invention. Laboratory computer 114 includes client listener 302. Client listener 302 resides in a separate partition within laboratory computer 114 and is available when laboratory computer 114 is first booted up. Client listener 302 receives an image file from image store 112 and loads this image file into a separate partition. After loading the image file into a separate partition, laboratory computer 114 is booted using this separate partition so that the image file is available for testing. After laboratory computer 114 has been rebooted using this test partition, user 102 is notified that laboratory computer 114 is available for testing. If a new image file or a modified image file has been created on laboratory computer 114, client listener 302 can upload this image file to image store 112 for use in subsequent tests.

Computer Testing Laboratory

Figure 4:
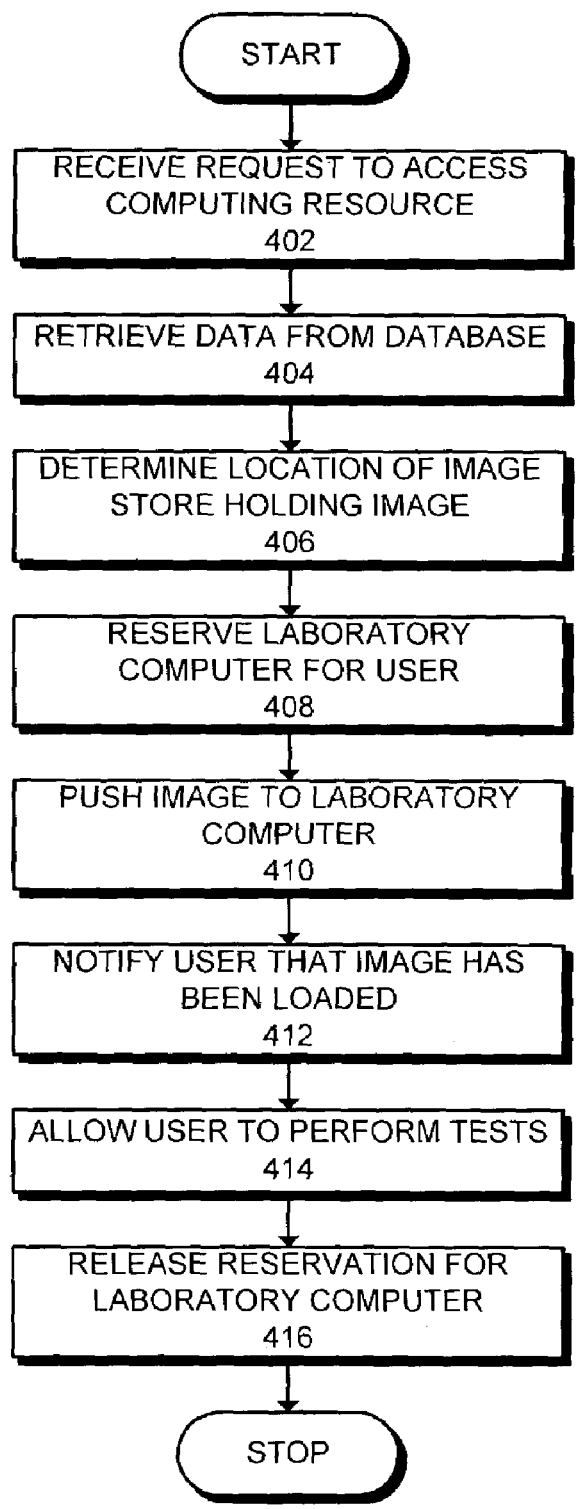
FIG. 4 is a flowchart illustrating the process of globalization testing in accordance with an embodiment of the present invention.

FIG. 4 is a flowchart illustrating the process of performing globalization testing in accordance with an embodiment of the present invention. The system starts when a request is received to access a computing resource to be used in testing computing software (step 402). Next, the system retrieves a list of computers and a list of available image files from the database (step 404). After the user has selected a computer and an image file, the system then determines the location of an image store the holds the image file (step 406). Note that the system typically selects the closest image store that includes the image file so that the access time can be minimized.

Once the image store has been selected, the system reserves a laboratory computer for the user (step 408). The laboratory computer can be reserved for a time specified in the request, a predetermined time, or a time selected by some other means. Next, the system pushes the image file to a laboratory computer where it is loaded into a partition (step 410). The user is then notified that the image file has been loaded and that the laboratory computer is ready for testing software (step 412).

The system allows the user to perform tests until the reserved time has expired or until the user releases the laboratory computer (step 414). Finally, the system releases the reservation for the laboratory computer (step 416).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automating the process of globalization testing of a computer software program, comprising:
   receiving a request at a server from a user to access a computing resource, wherein the request specifies an operating system and an interface language for the computing resource;
   performing a database lookup to identify an available computer from a list of available computers and an available image file for the operating system and interface language combination from a list of available image files;
   determining a location of an image store containing the image file;
   pushing the image file from the image store to the computer, so that the computer includes the required operating system and interface language combination; and
   notifying the user that the image file has been downloaded to the computer, thereby allowing the user to perform globalization testing of the computer software program on the computer using the image file.

2. The method of claim 1, wherein if the image file is not available in the image store, the method further comprises:
   creating the image file for operating system and interface language combination; and
   saving the image file into the image store.

3. The method of claim 1, further comprising reserving the computer for a specified time period.

4. The method of claim 1, further comprising allowing the user to test a software component with the image file on the computer, wherein the software component becomes part of the image file.

5. The method of claim 4, further comprising uploading the image file to the image store for subsequent reuse, wherein the image file includes the software component.

6. The method of claim 1, further comprising authenticating the user prior to allowing the user to perform testing.

7. The method of claim 1, wherein notifying the user involves one of, delivering an electronic mail message to the user and posting status to a web page for the user.

8. A computer-readable physical storage medium storing instructions that when executed by a computer cause the computer to perform a method for automating the process of globalization testing of a computer software program, the method comprising:
   receiving a request at a server from a user to access a computing resource, wherein the request specifies an operating system and an interface language for the computing resource;
   performing a database lookup to identify an available computer from a list of available computers and an available image file for the operating system and interface language combination from a list of available image files;
   determining a location of an image store containing the image file;
   pushing the image file from the image store to the computer, so that the computer includes the required operating system and interface language combination; and
   notifying the user that the image file has been downloaded to the computer, thereby allowing the user to perform globalization testing of the computer software program on the computer using the image file.

9. The computer-readable physical storage medium of claim 8, wherein if the image file is not available in the image store, the method further comprises:
   creating the image file for operating system and interface language combination; and
   saving the image file into the image store.

10. The computer-readable physical storage medium of claim 8, the method further comprising further comprising reserving the computer for a specified time period.

11. The computer-readable physical storage medium of claim 8, the method further comprising allowing the user to test a software component with the image file on the computer, wherein the software component becomes part of the image file.

12. The computer-readable physical storage medium of claim 11, the method further comprising uploading the image file to the image store for subsequent reuse, wherein the image file includes the software component.

13. The computer-readable physical storage medium of claim 8, the method further comprising authenticating the user prior to allowing the user to perform testing.

14. The computer-readable physical storage medium of claim 8, wherein notifying the user involves one of, delivering an electronic mail message to the user and posting status to a web page for the user.

15. An apparatus automating the process of globalization testing of a computer software program, comprising:
   a receiving mechanism configured to receive a request at a server from a user to access a computing resource, wherein the request specifies an operating system and an interface language for the computing resource;
   a performing mechanism configured to perform a database lookup to identify an available computer from a list of available computers and an available image file for the operating system and interface language combination from a list of available image files;
   a determining mechanism configured to determine a location of an image store containing the image file;
   a pushing mechanism configured to push the image file from the image store to the computer, so that the computer includes the required operating system and interface language combination; and
   a notifying mechanism configured to notify the user that the image file has been downloaded to the computer, thereby allowing the user to perform globalization testing of the computer software program on the computer using the image file.

16. The apparatus of claim 15, further comprising:
   a creating mechanism configured to create the image file for operating system and interface language combination; and
   a saving mechanism configured to save the image file into the image store.

17. The apparatus of claim 15, further comprising a reserving mechanism configured to reserve the computer for the user for a specified duration.

18. The apparatus of claim 15, further comprising a testing mechanism configured to allow the user to test a software component with the image file on the computer, wherein the software component becomes part of the image file.

19. The apparatus of claim 18, further comprising an uploading mechanism configured to upload the image file to the image store for subsequent reuse, wherein the image file includes the software component.

20. The apparatus of claim 15, further comprising an authenticating mechanism configured to authenticate the user prior to allowing the user to perform testing.

21. The apparatus of claim 15, wherein the notifying mechanism is further configured to notify the user by one of delivering an electronic mail message to the user and posting a status to a web page for the user.

* * * * *

UNITED STATES PATENT AND TRADEMARK OFFICE
CERTIFICATE OF CORRECTION

| | |
|---|---|
| PATENT NO. | : 7,143,391 B1 |
| APPLICATION NO. | : 10/316568 |
| DATED | : November 28, 2006 |
| INVENTOR(S) | : Hui Guo |

Page 1 of 1

It is certified that error appears in the above-identified patent and that said Letters Patent is hereby corrected as shown below:

In Attorney, Agent, or Firm (74), please delete the attorney last name, "Grunuler" and replace with the attorney last name --Grundler--.

In claim 10 (at column 6, line 2), please delete the words, "further comprising further comprising" and replace with the words --further comprising--.

Signed and Sealed this

Twenty-seventh Day of February, 2007

JON W. DUDAS
*Director of the United States Patent and Trademark Office*